(12) United States Patent
Kircher et al.

(10) Patent No.: US 10,202,195 B2
(45) Date of Patent: Feb. 12, 2019

(54) PASSENGER CABIN AREA

(71) Applicant: Airbus Operations GmbH, Hamburg (DE)

(72) Inventors: Benedikt Kircher, Hamburg (DE); Stephan Waetzold, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/728,139

(22) Filed: Oct. 9, 2017

(65) Prior Publication Data
US 2018/0029711 A1 Feb. 1, 2018

Related U.S. Application Data

(63) Continuation of application No. PCT/EP2016/056849, filed on Mar. 30, 2016.

(30) Foreign Application Priority Data

Apr. 10, 2015 (DE) .................. 10 2015 206 435

(51) Int. Cl.
*B64D 11/06* (2006.01)
*B64C 1/00* (2006.01)
*B64D 11/00* (2006.01)

(52) U.S. Cl.
CPC ............ *B64D 11/06* (2013.01); *B64C 1/00* (2013.01); *B64D 11/00* (2013.01); *B64D 11/003* (2013.01); *B64C 2001/0018* (2013.01)

(58) Field of Classification Search
CPC ....... B64D 11/06; B64D 11/003; B64D 11/00; B64C 1/00; B64C 1/22; Y02T 50/46
See application file for complete search history.

(56) References Cited

U.S. PATENT DOCUMENTS 4,022,404 A * 5/1977 Greiss ............... B64D 11/0007
186/40
4,066,227 A * 1/1978 Buchsel ................ B64D 11/00
105/340

(Continued)

FOREIGN PATENT DOCUMENTS

DE 68915863 T2 12/1994
DE 19910779 A1 9/2000

(Continued)

OTHER PUBLICATIONS

German Office Action for Application No. 102015206435 dated Feb. 18, 2016.

(Continued)

*Primary Examiner* — Medhat Badawi
(74) *Attorney, Agent, or Firm* — Jenkins, Wilson, Taylor & Hunt, P.A.

(57) ABSTRACT

A passenger cabin area, which is suitable for installation in an aircraft cabin, includes passenger seats arranged one behind another along a longitudinal axis of the passenger cabin area. The passenger cabin area also includes luggage compartments which are arranged, at least in certain sections, in an area between an inner face, which faces towards an interior space of the passenger cabin area, of a fuselage sidewall and the passenger seats, and have an access aperture which faces towards the passenger seats.

14 Claims, 4 Drawing Sheets

(56) References Cited

U.S. PATENT DOCUMENTS

| | | | | |
|---|---|---|---|---|
| 4,191,411 | A * | 3/1980 | Rodgers | E05B 65/0014 292/128 |
| 5,024,398 | A * | 6/1991 | Riedinger | B64D 11/0015 244/118.5 |
| 5,035,471 | A | 7/1991 | Ackerman | |
| 5,090,639 | A * | 2/1992 | Miller | B64D 9/00 244/118.1 |
| 5,224,297 | A * | 7/1993 | Watkins | E05L 317/04 292/210 |
| 5,542,626 | A | 8/1996 | Beuck et al. | |
| 5,957,407 | A * | 9/1999 | Auestad | B64D 11/0693 244/118.6 |
| 6,152,400 | A * | 11/2000 | Sankrithi | B64D 11/00 105/315 |
| 6,237,872 | B1 * | 5/2001 | Bar-Levav | B64D 11/00 105/314 |
| 6,273,365 | B1 | 8/2001 | Hiesener et al. | |
| D455,391 | S * | 4/2002 | Granzeier | D12/345 |
| 6,676,079 | B2 * | 1/2004 | Takeshima | B64D 11/0023 244/118.5 |
| 6,696,979 | B2 * | 2/2004 | Manten | B64C 1/1469 180/287 |
| 6,857,598 | B2 * | 2/2005 | Adamson | B64C 1/0009 244/119 |
| 7,178,854 | B2 * | 2/2007 | Ichinose | B60J 5/06 296/146.2 |
| 8,047,467 | B2 * | 11/2011 | Erickson | B64D 11/0015 244/118.1 |
| 8,469,311 | B2 * | 6/2013 | Saint-Jalmes | B64D 11/0691 244/118.5 |
| 8,820,862 | B1 * | 9/2014 | Erickson | B64D 11/0691 312/257.1 |
| 8,899,634 | B1 * | 12/2014 | Stile | E05L 315/022 292/145 |
| 9,278,757 | B2 | 3/2016 | Dupont | |
| 9,321,533 | B2 * | 4/2016 | Cuddy | B64C 1/1407 |
| 2002/0033432 | A1 | 3/2002 | Mikosza | |
| 2003/0029967 | A1 * | 2/2003 | Mills | B64D 11/00 244/118.5 |
| 2003/0071507 | A1 | 4/2003 | Sankrithi | |
| 2004/0217234 | A1 * | 11/2004 | Jones | A61M 21/02 244/118.5 |
| 2005/0133308 | A1 * | 6/2005 | Reysa | B64D 11/0007 186/40 |
| 2006/0049310 | A1 * | 3/2006 | Park | B64D 11/00 244/118.5 |
| 2007/0170310 | A1 * | 7/2007 | Bock | B64D 11/0604 244/118.5 |
| 2010/0219292 | A1 * | 9/2010 | Saint-Jalmes | B64D 11/0023 244/118.5 |
| 2010/0316468 | A1 * | 12/2010 | Lert | B65G 1/045 414/273 |
| 2011/0233333 | A1 * | 9/2011 | Papke | B64D 11/00 244/118.6 |
| 2012/0138743 | A1 * | 6/2012 | Boren | B64D 11/00 244/118.5 |
| 2013/0068890 | A1 * | 3/2013 | Boren | B64D 11/00 244/137.2 |
| 2013/0106156 | A1 * | 5/2013 | Orson | B64D 11/06 297/217.3 |
| 2013/0119203 | A1 * | 5/2013 | Dupont | B64C 1/18 244/137.2 |
| 2013/0247590 | A1 * | 9/2013 | Lu | F25B 21/02 62/3.6 |
| 2013/0306793 | A1 * | 11/2013 | Erben | B64C 1/00 244/118.1 |
| 2014/0008492 | A1 * | 1/2014 | Ehlers | B64D 11/00 244/118.5 |
| 2014/0166807 | A1 | 6/2014 | Boren et al. | |
| 2014/0346274 | A1 * | 11/2014 | Orson | B64D 11/00 244/118.5 |

FOREIGN PATENT DOCUMENTS

| | | |
|---|---|---|
| EP | 2583894 A2 | 4/2013 |
| FR | 2909941 A1 | 6/2008 |
| WO | WO 2015/181801 A2 | 12/2015 |

OTHER PUBLICATIONS

International Search Report and Written Opinion for Application No. PCT/EP2016/056849 dated Jun. 3, 2016.

* cited by examiner

PASSENGER CABIN AREA

CROSS-REFERENCE TO RELATED APPLICATIONS

This application is a continuation of and claims priority to PCT/EP2016/056849 filed Mar. 30, 2016, which claims the benefit of and priority to German Patent Application No. 10 2015 206 435.2 filed Apr. 10, 2015, the entire disclosures of which are incorporated by reference herein.

TECHNICAL FIELD

The disclosure herein relates to a passenger cabin area which is suitable for installation in an aircraft cabin.

BACKGROUND

Passenger capacity is a parameter which is essential to the profitability of a passenger aircraft. Efforts are therefore made to fit the passenger cabin of modern commercial aircraft with as many passenger seats as desirable or possible. However it is necessary, when designing the passenger cabin and, in particular, fitting the latter with passenger seats, to adhere to certain framework conditions. For example, a certain minimum distance must be adhered to between rows of passenger seats that are arranged one behind another. Sufficient stowage space for the passengers' hand luggage must also be available. An aircraft passenger cabin is therefore usually equipped with a large number of luggage compartments which are mounted in the overhead area of the passenger cabin above the rows of passenger seats.

An underlying object of the disclosure herein is to indicate a passenger cabin area which permits a significant increase in the passenger capacity of a passenger aircraft without unduly impairing the passengers' comfort.

This object is achieved by a passenger cabin area having the features such as those disclosed herein.

SUMMARY

A passenger cabin area comprises a plurality of passenger seats arranged one behind another along a longitudinal axis of the passenger cabin area. The passenger cabin area also comprises a plurality of luggage compartments which are arranged, at least in certain sections, in an area between an inner face, which faces towards an interior space of the passenger cabin area, of a fuselage sidewall and the passenger seats. The luggage compartments have an access aperture which faces towards the passenger seats. In the passenger cabin area, the luggage compartments are accordingly not mounted, as it usually the case, in the overhead area of the passenger cabin area but are arranged laterally beside the passenger seats. For example, one section of the luggage compartments may be arranged laterally beside the backrests of the passenger seats, and one section of the luggage compartments may protrude beyond the backrests of the passenger seats towards a ceiling of the passenger cabin area. The luggage compartments are then arranged at a height at which their access apertures are easily accessible to passengers who want to load their items of hand luggage into the luggage compartments. If desired or necessary, however, the luggage compartments may also be arranged in such a way that they are arranged completely, i.e. over their entire height, between that inner face of the fuselage sidewall which faces towards the interior space of the passenger cabin area and the passenger seats, and do not protrude beyond the backrests of the passenger seats towards the ceiling of the passenger cabin area.

The arrangement of the luggage compartments at the side of the passenger seats makes it possible to install the passenger cabin area in an area of an aircraft cabin in which a lower ceiling height is available than in the main deck of the aircraft cabin, without passengers accommodated in the passenger cabin area being adversely affected by luggage compartments fitted at a low height above the passenger seats. In addition, the passenger cabin area offers sufficient stowage space for the passengers' items of hand luggage which, moreover, can still be loaded into the luggage compartments conveniently and at a comfortable height through the access apertures facing the passenger seats. The passenger cabin area thus permits the use of an area of an aircraft cabin with a lower ceiling height for conveying passengers, and thereby a significant increase in the passenger capacity of an aircraft equipped with the passenger cabin area. At the same time, the passenger cabin area offers the passengers accommodated in it a degree of comfort which is comparable to the comfort of passengers sitting in the main deck of the aircraft cabin.

At least one luggage compartment out of the plurality of luggage compartments may comprise a closure flap, which is movable between a closing position and an open position, for respectively closing and unblocking the access aperture. The closure flap may, for example, be tiltable between its closing position and its open position about an axis of pivoting which may be arranged in the area of an upper edge of the access aperture. As an alternative to this, at least one luggage compartment out of the plurality of luggage compartments may also be provided with a closure flap which can be displaced, along the longitudinal axis of the passenger cabin area, between its closing position and its open position. Finally, it is also conceivably possible for the closure flap to be configured in the form of a roller shutter which can be moved, perpendicularly to the longitudinal axis of the passenger cabin area and parallel to a plane defined by the access aperture, between a closing position and an open position. If a luggage compartment is provided with a closure flap, items of luggage arranged in the luggage compartment are securely prevented from falling out of it.

In one particularly preferred embodiment of the passenger cabin area, the luggage compartments are arranged in an area between that inner face of the fuselage sidewall which faces towards the interior space of the passenger cabin area and a row of structure-supporting elements which are positioned one behind another along the longitudinal axis of the passenger cabin area. In other words, within the passenger cabin area, the structure-supporting elements which serve for structurally stiffening the structure of the aircraft fuselage are preferably positioned between the passenger seats and the luggage compartments. Such a configuration of the passenger cabin area permits optimum utilization of the space which is present within it.

At least one luggage compartment out of the plurality of luggage compartments preferably has sidewalls which extend, substantially perpendicularly to the longitudinal axis of the passenger cabin area and in alignment with two mutually adjacent structure-supporting elements, towards that inner face of the fuselage sidewall which faces towards the interior space of the passenger cabin area. In the case of a luggage compartment which is equipped in this way, the access aperture lies between the two mutually adjacent structure-supporting elements and is consequently particularly easily accessible. However, a space which lies between the structure-supporting elements and the rear wall of the luggage compartment is then not usable as stowage space for luggage, but may merely serve as installation space for the sidewalls of the luggage compartment.

At least one luggage compartment out of the plurality of luggage compartments may have at least one sidewall which extends substantially perpendicularly to the longitudinal axis of the passenger cabin area and in a manner offset along the longitudinal axis of the passenger cabin area in relation to a structure-supporting element which is arranged between the particular access aperture of the luggage compartment and the passenger seats. In such a configuration of the passenger cabin area, the distances between the sidewalls of the luggage compartment along the longitudinal axis of the passenger cabin area are no longer adapted or configured to the distances between mutually adjacent structure-supporting elements along the longitudinal axis of the passenger cabin area. On the contrary, the sidewalls of the luggage compartment are preferably arranged at a greater distance from one another along the longitudinal axis of the passenger cabin area than mutually adjacent structure-supporting elements. In such a configuration of a luggage compartment, it is also possible to use the space which lies between the structure-supporting elements and the rear wall of the luggage compartment, i.e. in the "shadow" of the structure-supporting elements, for accommodating items of luggage. All that is necessary for this purpose is to push items of luggage which are loaded into the luggage compartment via the access aperture along the longitudinal axis of the passenger cabin area into the "shadow" of the structure-supporting elements. This permits optimum utilization of the space which is present in the passenger cabin area for accommodating items of luggage. Moreover it is possible, in the case of a luggage compartment which allows an item of luggage accommodated in the luggage compartment to be positioned in the "shadow" of a structure-supporting element, to optionally dispense with a closure flap for closing or unblocking the access aperture, since the item of luggage is held in its position within the luggage compartment by the structure-supporting element.

The passenger cabin area may be equipped exclusively with luggage compartments whose sidewalls extend, substantially perpendicularly to the longitudinal axis of the passenger cabin area and in alignment with two mutually adjacent structure-supporting elements, towards that inner face of the fuselage sidewall which faces towards the interior space of the passenger cabin area. As an alternative to this, the passenger cabin area may also be fitted exclusively with luggage compartments which have at least one sidewall which extends substantially perpendicularly to the longitudinal axis of the passenger cabin area and in a manner offset along the longitudinal axis of the passenger cabin area in relation to a structure-supporting element which is arranged between the particular access aperture of the luggage compartments and the passenger seats. However, the configuration of the luggage compartments within the passenger cabin area can also be varied as required, i.e. the passenger cabin area may both be equipped with luggage compartments in which the distance between the sidewalls of the luggage compartment is adapted or configured to the distance between mutually adjacent structure-supporting elements, and also comprise luggage compartments which have at least one sidewall which is arranged in a manner offset along the longitudinal axis of the passenger cabin area in relation to a structure-supporting element.

There is preferably provided, in the area of the access aperture of at least one luggage compartment out of the plurality of luggage compartments and between structure-supporting elements which are arranged one behind another along the longitudinal axis of the passenger cabin area, a place-keeper which prevents items of luggage from being arranged between the structure-supporting elements which are arranged one behind another along the longitudinal axis of the passenger cabin area. The place-keeper prevents items of luggage which slip, within the luggage compartment, in a direction along the longitudinal axis of the passenger cabin area, from bumping against the structure-supporting elements and subjecting them to a load which is directed along the longitudinal axis of the passenger cabin area. The place-keeper thus ensures that the structure-supporting elements do not have their structural mechanical function impaired by items of luggage arranged in the luggage compartment.

The place-keeper may be constructed, for example, in the form of a projection which protrudes, in the area of the access aperture, into the interior space of the luggage compartment from an inner face, which faces towards the interior space of the luggage compartment, of a floor of the luggage compartment. The place-keeper preferably only protrudes into the interior space of the luggage compartment to an extent such that it does not unduly impair the loading of the luggage compartment with items of luggage, but securely prevents items of luggage from being arranged in the space between the structure-supporting elements.

If desired, the place-keeper may be movable, in a direction perpendicular to the floor of the luggage compartment, between a first position and a second position. In its first position, the place-keeper preferably protrudes less far into the interior space of the luggage compartment than in its second position. When the place-keeper is located in its first position, the luggage compartment can be easily loaded with items of luggage. In its second position, the place-keeper reliably prevents items of luggage from being arranged in the space between the structure-supporting elements.

At least one luggage compartment out of the plurality of luggage compartments is preferably so dimensioned or dimensionally configured that it is suitable for receiving one standard item of hand luggage. Moreover, at least one luggage compartment out of the plurality of luggage compartments may be so dimensioned or dimensionally configured that it is suitable for receiving a plurality of standard items of hand luggage, in particular two standard items of hand luggage.

Basically, the passenger cabin area may be equipped with only one type of luggage compartment, which is suitable for receiving one standard item of hand luggage or for receiving a plurality of standard items of hand luggage, in particular two. In one preferred embodiment, however, the passenger cabin area comprises, in a manner alternating along the longitudinal axis of the passenger cabin area, luggage compartments which are so dimensioned or dimensionally configured that they are suitable for receiving one standard item of hand luggage, and luggage compartments which are so dimensioned or dimensionally configured that they are suitable for receiving a plurality of standard items of hand luggage. The luggage compartments can then be used in a particularly flexible manner.

At least one luggage compartment out of the plurality of luggage compartments, which is so dimensioned or dimensionally configured that it is suitable for receiving a plurality of standard items of hand luggage, in particular two, may be provided with a separating and keeping-free device which is adapted or configured to separate from one another sections of the luggage compartment which are intended for individual items of luggage, and which further is adapted or configured to keep free a section, which is to be kept free, between those sections of the luggage compartment which are intended for individual items of luggage. The section which is to be kept free may be formed, for example, by a space which is arranged centrally within the luggage compartment and has a strip-shaped basal face and which extends, perpendicularly to the longitudinal axis of the passenger cabin area, between the access aperture of the luggage compartment and the rear wall of the luggage compartment. The section which is to be kept free permits displacement of the items of luggage within the luggage compartment along the longitudinal axis of the passenger cabin area, so that a fully loaded luggage compartment can be conveniently loaded or unloaded even if the items of luggage in the luggage compartment are arranged in the "shadow" of the structure-supporting elements.

In one simple and cost-effective variant, the separating and keeping-free device may be constructed in the form of a sticker which may be attached in the area of an inner face, which faces towards the interior space of the luggage compartment, of the floor of the luggage compartment.

As an alternative to this, the separating and keeping-free device may also be constructed in the form of a projection which protrudes into the interior space of the luggage compartment from that inner face of the floor of the luggage compartment which faces towards the interior space of the luggage compartment. A separating and keeping-free device which is constructed in the form of a projection has the advantage that it separates items of luggage arranged in the luggage compartment from one another and keeps them in their positions. The projection forming the separating and keeping-free device may be constructed in a wedge-shaped manner, at least in the area of a surface that faces away from the floor of the luggage compartment. When the luggage compartment is being loaded with items of luggage, the items of luggage are then guided along the wedge-shaped surface of the projection into the desired position within the luggage compartment. When the luggage compartment is being unloaded, the items of luggage are correspondingly guided along the wedge-shaped surface of the projection from their position in the "shadow" of the structure-supporting elements towards the access aperture of the luggage compartment.

The separating and keeping-free device may be movable, in a direction perpendicular to the floor of the luggage compartment, between a first position and a second position. In its first position, the separating and keeping-free device preferably protrudes less far into the interior space of the luggage compartment than in its second position. When the separating and keeping-free device is located in its first position, the luggage compartment can be easily loaded with items of luggage. In its second position, the separating and keeping-free device separates the items of luggage arranged in the luggage compartment from one another, and reliably keeps free that section of the luggage compartment which is to be kept free between the items of luggage.

BRIEF DESCRIPTION OF THE DRAWINGS

Preferred embodiments of the disclosure herein will now be explained in greater detail with the aid of the appended diagrammatic and example drawings, in which.

DETAILED DESCRIPTION

Figure 1:
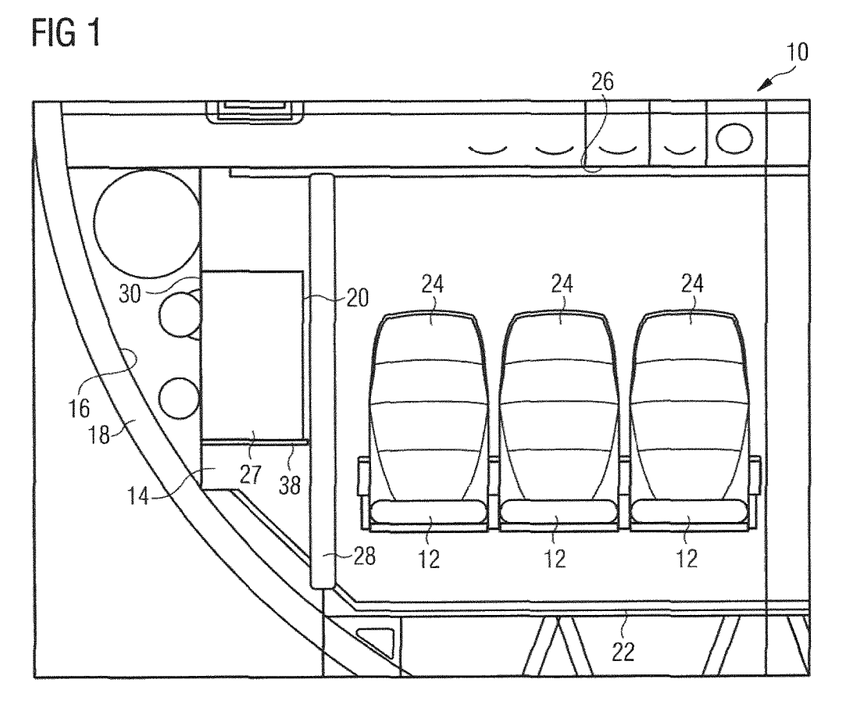
FIG. 1 shows a front view of a passenger cabin area which is suitable for installation in an aircraft cabin.
Figure 2:
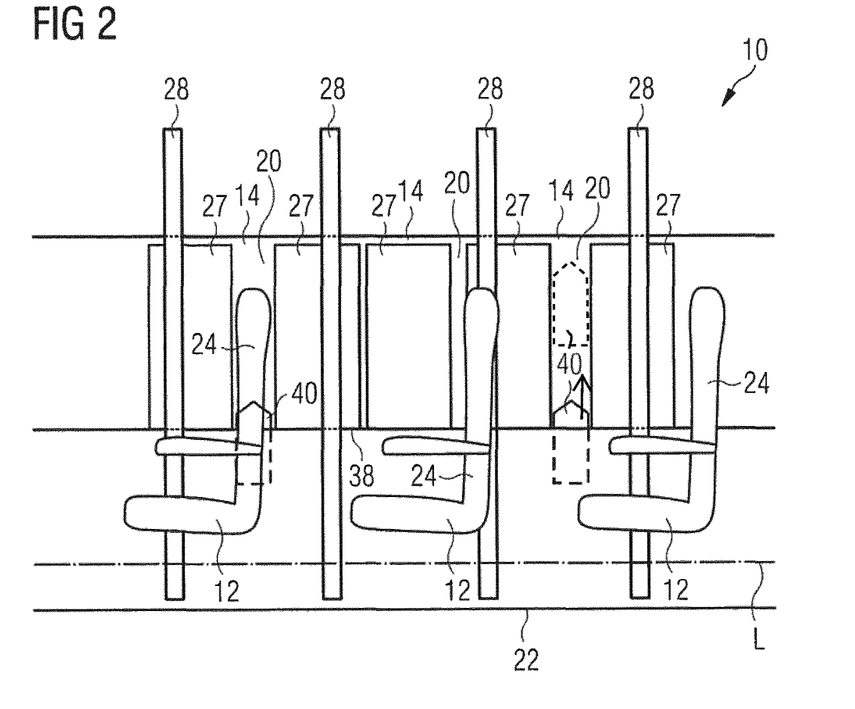
FIG. 2 shows a side view of the passenger cabin area according to FIG. 1.

A passenger cabin area 10 which is illustrated in FIGS. 1 and 2 comprises a plurality of passenger seats 12 which are arranged one behind another along a longitudinal axis L of the passenger cabin area 10. In the embodiment illustrated in FIGS. 1 and 2, the passenger seats 12 are arranged in rows, each having three seats 12. However a configuration of the passenger cabin area 10 is also conceivably possible, in which the passenger seats 12 are arranged in rows of two or in one row of two and one row of three.

Also provided in the passenger cabin area 10 is a plurality of luggage compartments 14. The luggage compartments 14 are arranged, at least in certain sections, in an area between an inner face 16, which faces towards an interior space of the passenger cabin area 10, of a fuselage sidewall 18 and the passenger seats 12. Each luggage compartment 14 has an access aperture 20 which extends substantially parallel to the longitudinal axis L of the passenger cabin area 10 and faces towards the passenger seats 12, i.e. a lateral face of the passenger seats 12 that faces towards the inner face 16 of the fuselage sidewall 18.

In particular, the luggage compartments 14 are arranged in such a way that a section of the luggage compartments 14 that faces towards a floor 22 of the passenger cabin area 10 is arranged laterally beside backrests 24 of the passenger seats 12. On the other hand, a section of the luggage compartments 14 that faces towards a ceiling 26 of the passenger cabin area 10 protrudes beyond the backrests 24 of the passenger seats 12 towards the ceiling 26 of the passenger cabin area 10. The luggage compartments 14 are then arranged at a height at which their access apertures 20 are easily accessible to passengers who want to load items of hand luggage 27 into the luggage compartments 14.

The arrangement of the luggage compartments 14 at the side of the passenger seats 12 makes it possible for the passenger cabin area 10 to be capable of being installed in an area of an aircraft cabin in which a lower ceiling height is available than in the main deck of the aircraft cabin, without passengers accommodated in the passenger cabin area 10 being adversely affected by luggage compartments 14 fitted at a low height above the passenger seats 12. In addition, the passenger cabin area 10 offers sufficient stowage space for the passengers' items of hand luggage 27 which, moreover, can still be loaded into the luggage compartments 14 conveniently and at a comfortable height through the access apertures 20 facing the passenger seats 12.

Also mounted in the passenger cabin area 10 is a plurality of structure-supporting elements 28 which are positioned one behind another in a row along the longitudinal axis L of the passenger cabin area 10. The structure-supporting elements 28 serve for structurally stiffening the structure of the aircraft fuselage and, in the arrangement according to FIGS. 1 and 2, are positioned between the passenger seats 12 and the luggage compartments 14. Consequently, the luggage compartments 14 are arranged in an area between that inner face 16 of the fuselage sidewall 18 which faces towards the interior space of the passenger cabin area 10 and the row of structure-supporting elements 28 which are positioned one behind another along the longitudinal axis L of the passenger cabin area 10.

Figure 3:
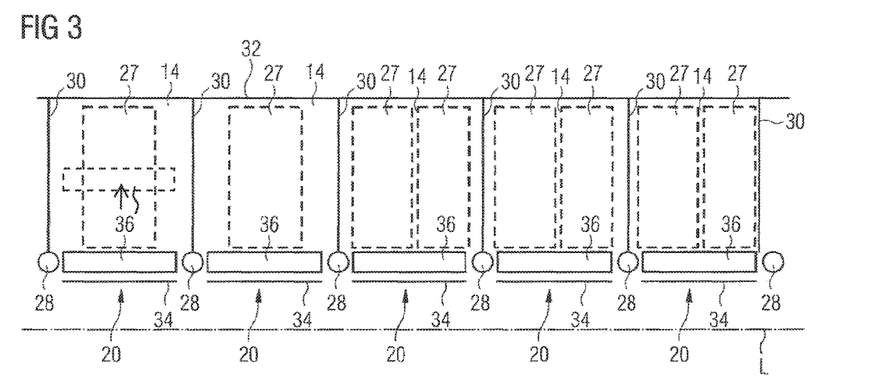
FIG. 3 shows a first embodiment of an arrangement of luggage compartments which is provided in the passenger cabin area according to FIGS. 1 and 2.
Figure 4:
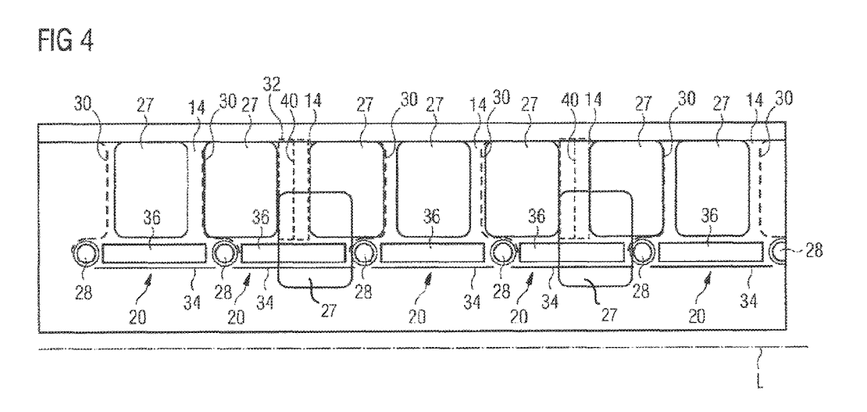
FIG. 4 shows a second embodiment of an arrangement of luggage compartments which is provided in the passenger cabin area according to FIGS. 1 and 2.

FIGS. 3 and 4 show two different embodiments of an arrangement of luggage compartments 14 which can be installed in the passenger cabin area 10 according to FIGS. 1 and 2. In the arrangement according to FIG. 3, the luggage compartments 14 have sidewalls 30 which extend, substantially perpendicularly to the longitudinal axis L of the passenger cabin area 10 and in alignment with two mutually adjacent structure-supporting elements 28, towards that inner face 16 of the fuselage sidewall 18 which faces towards the interior space of the passenger cabin area 10. The access apertures 20 of the luggage compartments 14 then lie, in each case, between two mutually adjacent structure-supporting elements 28 and are consequently easily accessible. In the arrangement according to FIG. 3, however, a space which lies between the structure-supporting elements 28 and a rear wall 32 of the luggage compartment is not usable as stowage space for luggage, but merely as installation space for the sidewalls 30 of the luggage compartments 14.

The arrangement of luggage compartments 14 shown in FIG. 4 differs from the configuration according to FIG. 3 through the fact that the sidewalls 30 of the luggage compartments 14 extend substantially perpendicularly to the longitudinal axis L of the passenger cabin area 10 and in a manner offset along the longitudinal axis L of the passenger cabin area 10 in relation to a structure-supporting element 28 which is arranged between the respective access apertures 20 of the luggage compartments 14 and the passenger seats 12. In the configuration according to FIG. 4, the distances between the sidewalls 30 of the luggage compartments 14 are consequently no longer adapted or configured to the distances between mutually adjacent structure-supporting elements 28 along the longitudinal axis L of the passenger cabin area 10. On the contrary, the sidewalls 30 of the luggage compartments 14 are preferably arranged at a greater distance from one another along the longitudinal axis L of the passenger cabin area 10 than mutually adjacent structure-supporting elements 28. In the arrangement according to FIG. 4, it is therefore also possible to use the space which lies between the structure-supporting elements 28 and the rear wall 32 of the luggage compartment, i.e. in the "shadow" of the structure-supporting elements 28, as stowage space for luggage.

In the arrangement according to FIG. 3, the luggage compartments 14 are each provided with a closure flap 34, which is movable between a closing position and an open position, for respectively closing and unblocking the access apertures 20 of the luggage compartments 14. The closure flap 34 may be designed, for example, in the form of a roller shutter which can be moved, perpendicularly to the longitudinal axis L of the passenger cabin area 10 and parallel to a plane defined by the access aperture 20, between a closing position and an open position. Items of luggage 27 arranged in the luggage compartments 14 are securely prevented from falling out of them by the closure flap 34.

In the arrangement according to FIG. 4, too, the luggage compartments 14 are each provided with a closure flap 34 for closing or unblocking the access aperture 20. However, it is optionally possible, at least in the case of the luggage compartments 14 in the arrangement according to FIG. 4, in which it is possible to position the items of luggage 27 in the "shadow" of the structure-supporting elements 28, to dispense with a closure flap 34, since the items of luggage 27 are kept in their position within the luggage compartments 14 by the structure-supporting elements 28.

In the arrangements of luggage compartments 14 according to FIGS. 3 and 4, some of the luggage compartments 14 are so dimensioned or dimensionally configured that they are suitable for receiving one standard item of hand luggage 27. Others of the luggage compartments 14, on the other hand, are so dimensioned or dimensionally configured that they are suitable for receiving a plurality of standard items of hand luggage; in the specific embodiment according to FIGS. 3 and 4, two standard items of hand luggage. In particular, there are provided in the arrangement of luggage compartments 14 which is shown in FIG. 4, in a manner alternating along the longitudinal axis L of the passenger cabin area 10, luggage compartments 14 which are so dimensioned or dimensionally configured that they are suitable for receiving one standard item of hand luggage 27, and luggage compartments 14 which are so dimensioned or dimensionally configured that they are suitable for receiving two standard items of hand luggage 27. The luggage compartments 14 can thus be used in a particularly flexible manner.

In the arrangements of luggage compartments 14 according to FIGS. 3 and 4, there is provided in each luggage compartment 14, in the area of the access aperture 20 between structure-supporting elements 28 which are arranged one behind another along the longitudinal axis L of the passenger cabin area 10, a place-keeper 36 which prevents items of luggage 27 from being arranged between the structure-supporting elements 28 which are arranged one behind another along the longitudinal axis L of the passenger cabin area 10. In the arrangements according to FIGS. 3 and 4, the place-keeper 36 is constructed in the form of a projection which protrudes into the interior space of the luggage compartment from an inner face, which faces towards the interior space of the luggage compartment, of a floor 38 of the luggage compartment 14. The place-keeper 36 prevents items of luggage 27 which move out of place, within the luggage compartments 14, in a direction along the longitudinal axis L of the passenger cabin area 10, from bumping against the structure-supporting elements 28. This ensures that the structure-supporting elements 28 are not subjected to loads which are directed along the longitudinal axis L of the passenger cabin area 10.

If desired, the place-keeper 36 may be movable, in a direction perpendicular to the floor 38 of the luggage compartment 14, between a first position and a second position, the place-keeper 36 protruding, in its first position, less far into the interior space of the luggage compartment 14 than in its second position. When the place-keeper 36 is located in its first position, the luggage compartment 14 can be easily loaded with items of luggage 27. In its second position, on the other hand, the place-keeper 36 reliably prevents items of luggage 27 from being arranged in the space between the structure-supporting elements 28.

Finally, in the luggage compartment arrangement according to FIG. 4, the luggage compartments 14 which are so dimensioned or dimensionally configured that they are suitable for receiving two standard items of hand luggage 27 are provided with a separating and keeping-free device 40. The separating and keeping-free device 40 is adapted or configured to separate from one another sections 14a, 14b of the luggage compartments 14 which are intended for individual items of luggage 27, and which further is adapted or configured to keep free a section 14c, which is to be kept free, between the sections 14a, 14b which are intended for individual items of luggage 27. In the arrangement according to FIG. 4, the section 14c which is to be kept free is formed by a space which is arranged centrally within the luggage compartment 14 and has a strip-shaped basal face and which extends, perpendicularly to the longitudinal axis L of the passenger cabin area 10, between the access aperture 20 of the luggage compartment 14 and the rear wall 32 of the luggage compartment. The section 14c which is to be kept free permits displacement of the items of luggage 27 received within the luggage compartment 14 along the longitudinal axis L of the passenger cabin area 10. Consequently, a luggage compartment 14 which is loaded with two items of luggage 27 can be conveniently loaded or unloaded even if the items of luggage 27 are to be arranged, or are arranged, in the luggage compartment 14 in the "shadow" of the structure-supporting elements 28.

In one variant which can be realised in a simple and cost-effective manner, the separating and keeping-free device 40 may be constructed in the form of a sticker which is attached in the area of an inner face, which faces towards the interior space of the luggage compartment 14, of the floor 38 of the luggage compartment 14. In the embodiment according to FIG. 4, however, the separating and keeping-free device is constructed in the form of a projection which protrudes into the interior space of the luggage compartment 14 from that inner face of the floor 38 of the luggage compartment 14 which faces towards the interior space of the luggage compartment 14.

In the area of a surface that faces away from the floor 38 of the luggage compartment 14, the projection forming the separating and keeping-free device 40 is constructed in a wedge-shaped manner; in this connection, see also FIG. 2. When the luggage compartment 14 is being loaded with items of luggage 27, the items of luggage 27 are guided along the surface, which is constructed in a wedge-shaped manner, of the separating and keeping-free device 40 into the desired position within the luggage compartment 14, i.e. into the desired position in the "shadow" of the structure-supporting elements 28. When the luggage compartment is being unloaded, the items of luggage 27 are correspondingly guided along the wedge-shaped surface of the separating and keeping-free device 40 from their position in the "shadow" of the structure-supporting elements 28 towards the access aperture 20 of the luggage compartment 14.

If desired, the separating and keeping-free device 40 may be movable, in a direction perpendicular to the floor 38 of the luggage compartment 14, between a first position and a second position, the separating and keeping-free device 40 protruding, in its first position, less far into the interior space of the luggage compartment 14 than in its second position. When the separating and keeping-free device 40 is located in its first position, the luggage compartment 14 can be easily loaded with items of luggage 27. In its second position, the separating and keeping-free device 40 separates the items of luggage 27 arranged in the luggage compartment 14 from one another, and reliably keeps free that section 14c which is to be kept free between the items of luggage 27.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger cabin area for installation in an aircraft cabin, the passenger cabin area comprising:
   a plurality of passenger seats arranged in rows one behind another along a longitudinal axis of the passenger cabin area; and
   a plurality of luggage compartments arranged, at least in certain sections, in an area between an inner face of a fuselage sidewall and the passenger seats,
   wherein the rows of passenger seats are outermost rows adjacent to the fuselage sidewall, and the plurality of luggage compartments are disposed laterally beside backrests of the passenger seats,
   wherein the plurality of luggage compartments each have an access aperture which opens towards the plurality of passenger seats, and
   wherein one or more luggage compartment of the plurality of luggage compartments is arranged in an area between the inner face of the fuselage sidewall and structure-supporting elements that are arranged in a row and positioned one behind another along the longitudinal axis of the passenger cabin area.

2. The passenger cabin area according to claim 1, wherein at least one luggage compartment of the plurality of luggage compartments comprises a closure flap, which is movable between a closed position and an open position, for respectively closing and unblocking the access aperture.

3. The passenger cabin area according to claim 1, wherein at least one luggage compartment of the plurality of luggage compartments has sidewalls which extend substantially perpendicularly to the longitudinal axis of the passenger cabin area and in alignment with two mutually adjacent structure-supporting elements, towards the inner face of the fuselage sidewall.

4. The passenger cabin area according to claim 1, wherein at least one luggage compartment of the plurality of luggage compartments has at least one sidewall which extends substantially perpendicularly to the longitudinal axis of the passenger cabin area and offset along the longitudinal axis of the passenger cabin area relative to the structure-supporting elements, which are arranged between respective access apertures of the luggage compartments and the passenger seats.

5. The passenger cabin area according to claim 1, comprising, in an area of at least one access aperture, between adjacent structure-supporting elements, a place-keeper which prevents items of luggage from bumping against the adjacent structure-supporting elements.

6. The passenger cabin area according to claim 5, wherein the place-keeper is constructed in a form of a projection which protrudes into an interior space of a respective luggage compartment of the plurality of luggage compartments from an inner face of a floor of the luggage compartment, which faces towards the interior space of the luggage compartment.

7. The passenger cabin area according to claim 6, wherein the place-keeper is movable, in a direction perpendicular to the floor of the luggage compartment, between a first position and a second position, and wherein the place-keeper protrudes, in a first position, less far into the interior space of the luggage compartment than in a second position.

8. The passenger cabin area according to claim 1, wherein at least one luggage compartment of the plurality of luggage compartments is dimensionally configured for receiving one standard item of hand luggage.

9. The passenger cabin area according to claim 1, wherein at least one luggage compartment of the plurality of luggage compartments is dimensionally configured for receiving a plurality of standard items of hand luggage.

10. The plurality of luggage compartments according to claim 1, which comprises, alternating along the longitudinal axis of the passenger cabin area, luggage compartments which are dimensionally configured for receiving one standard item of hand luggage, and luggage compartments which are dimensionally configured for receiving a plurality of standard items of hand luggage.

11. The passenger cabin area according to claim 9,
wherein the at least one luggage compartment, which is dimensionally configured for receiving a plurality of standard items of hand luggage, is provided with a separating and keeping-free device; and
wherein the separating and keeping-free device is configured to separate from one another sections of the at least one luggage compartment which are intended for individual items of luggage and which is configured to keep free a section between those sections of the at least one luggage compartment which are intended for individual items of luggage.

12. The passenger cabin area according to claim 11, wherein the separating and keeping-free device is constructed in a form of a sticker which is attached in the area of an inner face of a floor of the luggage compartment, which faces towards the interior space of the luggage compartment.

13. The passenger cabin area according to claim 11, wherein the separating and keeping-free device is constructed in a form of a projection which is provided with a wedge-shaped surface and which protrudes into the interior space of the luggage compartment from the inner face of the floor of the luggage compartment.

14. The passenger cabin area according to claim 13, wherein the separating and keeping-free device is movable, in a direction perpendicular to the floor of the luggage compartment, between a first position and a second position, and wherein the separating and keeping-free device protrudes, in a first position, less far into the interior space of the luggage compartment than in a second position.

* * * * *